United States Patent [19]

von Gierke et al.

[11] 4,238,772

[45] Dec. 9, 1980

[54] IMAGE ENHANCEMENT USING ON-LINE SPATIAL FILTERING

[75] Inventors: Henning E. von Gierke, Yellow Springs; Mark W. Cannon, Jr., Dayton, both of Ohio

[73] Assignee: The United States of America as represented by the Secretary of the Air Force, Washington, D.C.

[21] Appl. No.: 64,337

[22] Filed: Aug. 3, 1979

[51] Int. Cl.³ ............................................. H04N 5/14
[52] U.S. Cl. .................................................... 358/166
[58] Field of Search ......................... 358/160, 166, 140

[56] References Cited

U.S. PATENT DOCUMENTS

| | | | |
|---|---|---|---|
| 3,283,070 | 11/1966 | Prince | 358/166 |
| 3,535,443 | 10/1970 | Pieke | 358/166 |
| 3,566,027 | 2/1971 | Paine | 358/166 |
| 4,164,788 | 8/1979 | Jain | 358/166 |

*Primary Examiner*—Richard Murray
*Assistant Examiner*—Tommy P. Chin

*Attorney, Agent, or Firm*—Joseph E. Rusz; Robert K. Duncan

[57] ABSTRACT

A scene is scanned line-by-line with a video camera transforming the spatial distribution of intensities present in the scene into a time-varying intensity function which is then filtered in real time. The time-varying function is passed through an electrical filter with adjustable passband and center frequency, and the filtered image is written on a storage tube or other suitable fast-memory array. The stored image which has been spatially filtered in the x direction is then scanned and read line-by-line (in the y direction) with the new scan lines perpendicular to the direction in which the image was written on the storage tube (or memory array). This transforms the spatial distribution of intensities on the storage tube (or memory array) into a time-varying function of intensities. This time-varying function is then passed through a second filter with adjustable passband and center frequency. The now doubly filtered image is displayed on a monitor, and represents the initial image spatially filtered on both x and y directions, with filter passbands and center frequencies chosen by the observer.

1 Claim, 5 Drawing Figures

IMAGE ENHANCEMENT USING ON-LINE SPATIAL FILTERING

RIGHTS OF THE GOVERNMENT

The invention described herein may be manufactured and used by or for the Government of the United States for all governmental purposes without the payment of any royalty.

BACKGROUND OF THE INVENTION

The desirability of enhancing optical scenes, aerial photographs, radar and infrared images so as to cue an observer to the presence of targets having specific characteristics has been well recognized. Many of the prior approaches to the spatial filtering of images, with filter bandwidths adjustable by the human observer so that continuous observation can be had of dynamic images with selected spatial bandwidths have appeared theoretically possible, but they have not heretofore been feasible due to their great expense, the voluminous equipment required, and the slowness of operation. The best known prior art is that contained in U.S. Pat. No. 3,283,070 to patentee M. D. Prince and U.S. Pat. No. 3,566,027 to patentee T. O. Paine.

BRIEF SUMMARY OF THE INVENTION

The invention provides near-real-time filtering of a video image with spatial frequency bands of the viewer's choosing. The filtering provides an approximation to known filtering processes in the human visual system and permits the results of these filtering processes to be observed in near real time with dynamic imagery. No known prior art device performs visual response function filtering in substantially real time. Observation of such filtered images aides in target, shape, object, and feature recognition of objects of different size. When the band pass filtered scene is viewed on the monitor, edges and corners of objects in the scene can be selectively made more or less visible to the observer by adjusting the filter center frequencies with the filter frequency band equal to or not equal to the expected target size. A thresholding operation can be performed on the resultant image leaving only important edges or corners thereby removing much background clutter unimportant in target detection. In some situations filtering is also beneficial with adjustable high pass or low pass filtering only.

BRIEF DESCRIPTION OF THE VIEW OF THE DRAWING

DESCRIPTION OF THE PREFERRED EMBODIMENT

The spatial filtering of imagery can assist in pattern, shape and object size recognition in the analysis of complex imagery. The mathematical computation and subsequent display of spatially filtered images is complex and could not previously be achieved on-line in near real time with reasonable computer capacity or special-purpose computers. By scanning the image, this invention transforms the two-dimensional spatial dependence of the image function into functions of time. The invention then carries out the normally complex spatial filtering by performing equivalent frequency filtering in the time domain. Retransformation into the space domain produces an image display approximately the mathematically rigorous spatially filtered image. Advantages of this invention are: (1) Near real-time display of the spatially filtered image. (2) Observation of imagery by an observer with continuously variable spatial filtering under his control. (3) The observation of spatially filtered dynamic imagery presently not accomplished in real time. (4) Use of readily available frequency filters in the time domain for special-purpose image processing equipment. The device disclosed is used to cue the observer of optical scenes, aerial photographs, radar and infrared imagery to the presence of targets of a specific size in the visual field by proper tuning of the x and y spatial frequency filters. The device is also used to remove the effects of spatial frequency masking by viewing the scene through a narrow band of spatial frequency components. This type of viewing will frequently reveal underlying structures that are masked when the unfiltered scene is viewed, and permit the viewer to see through certain types of camouflage.

Figure 1:
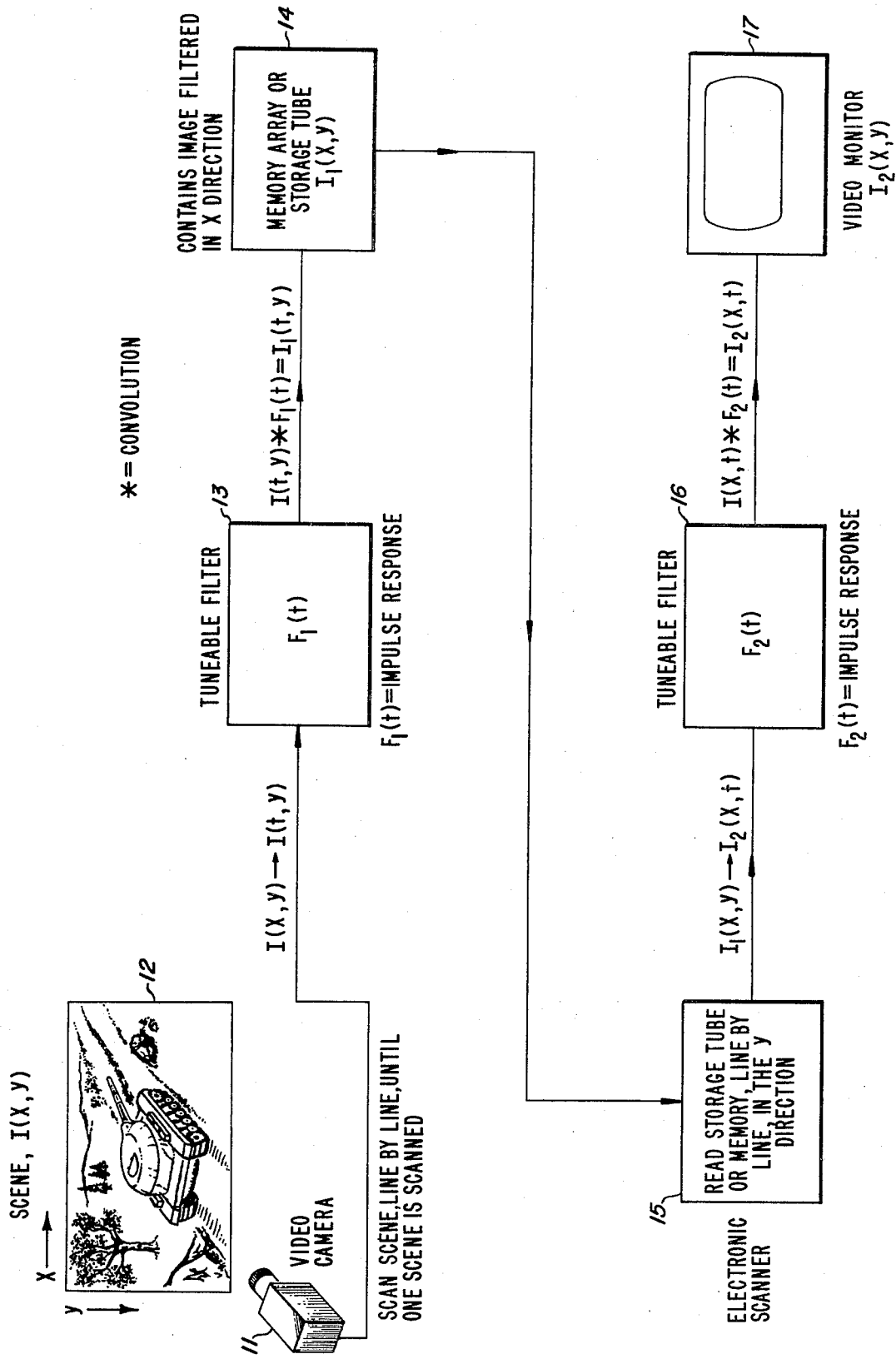
FIG. 1 is a simplified block diagram of an embodiment of the invention.

A typical embodiment of the invention is shown in FIG. 1. The line-by-line scanning properties of a video camera 11 are utilized to transform the spatial distribution of intensities present in a scene 12 into a time-varying intensity function. The time-varying function is frequency filtered in real time by passing it through an electrical filter 13 with adjustable pass band and center frequency, and the filtered image is written on a storage tube 14 or any other fast-memory array. The stored image has now been spatially filtered in the x direction. The storage tube (or memory) is scanned electrically by scanner 15 and read line by line (in the y direction) with the new scan lines perpendicular to the direction in which the image was written on the storage tube (or memory array). This step transforms the spatial distribution of intensities on the storage tube (or memory array) into a time-varying function of intensities. This time-varying function is passed through a second filter 16 with adjustable pass-band and center frequency. The doubly filtered image is displayed on monitor 17 and represents the initial image spatially filtered in both x and y directions with filter pass bands and center frequencies chosen by the observer.

Figure 2:
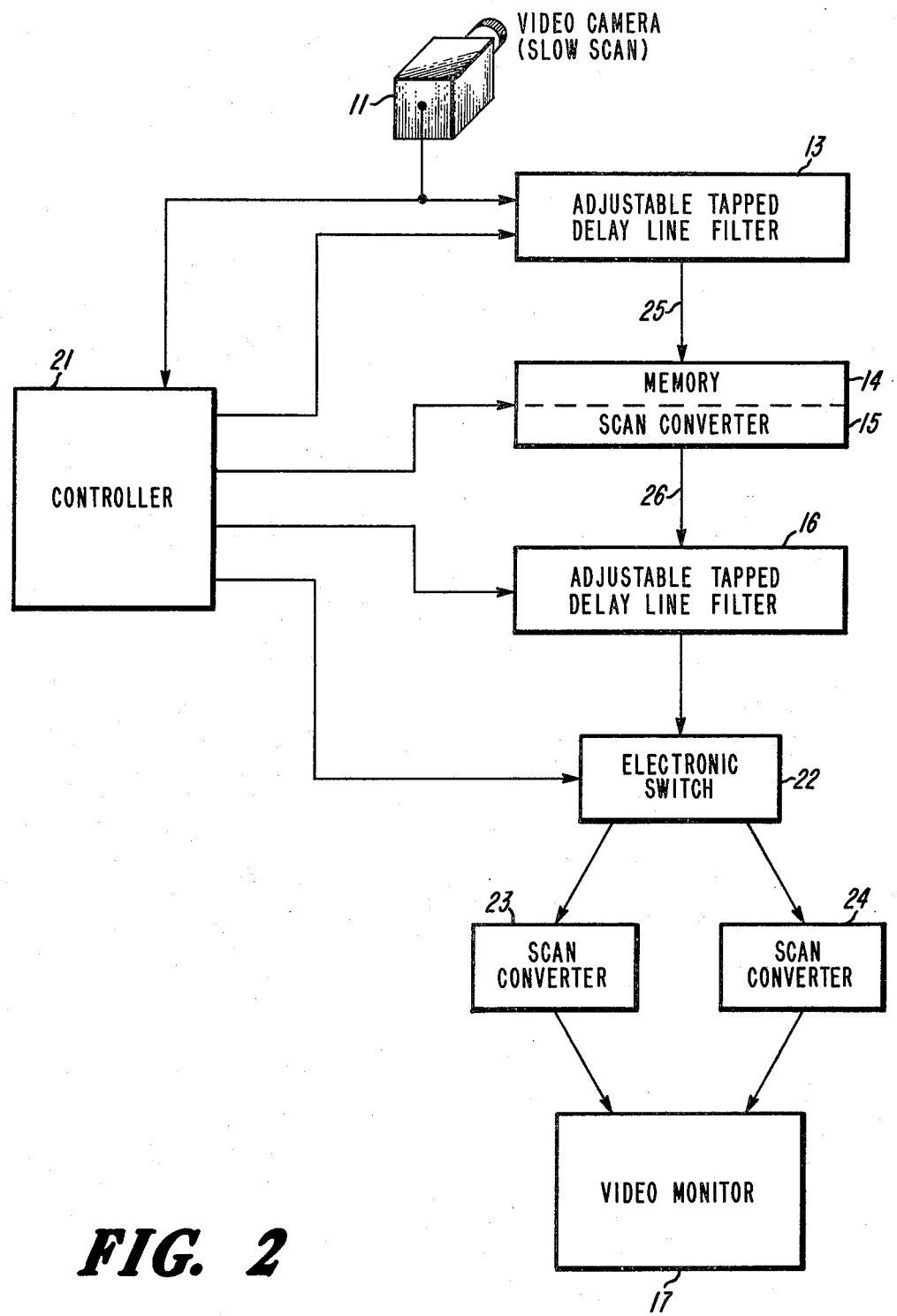
FIG. 2 is a more detailed block diagram of a typical embodiment of the invention.
Figure 3:
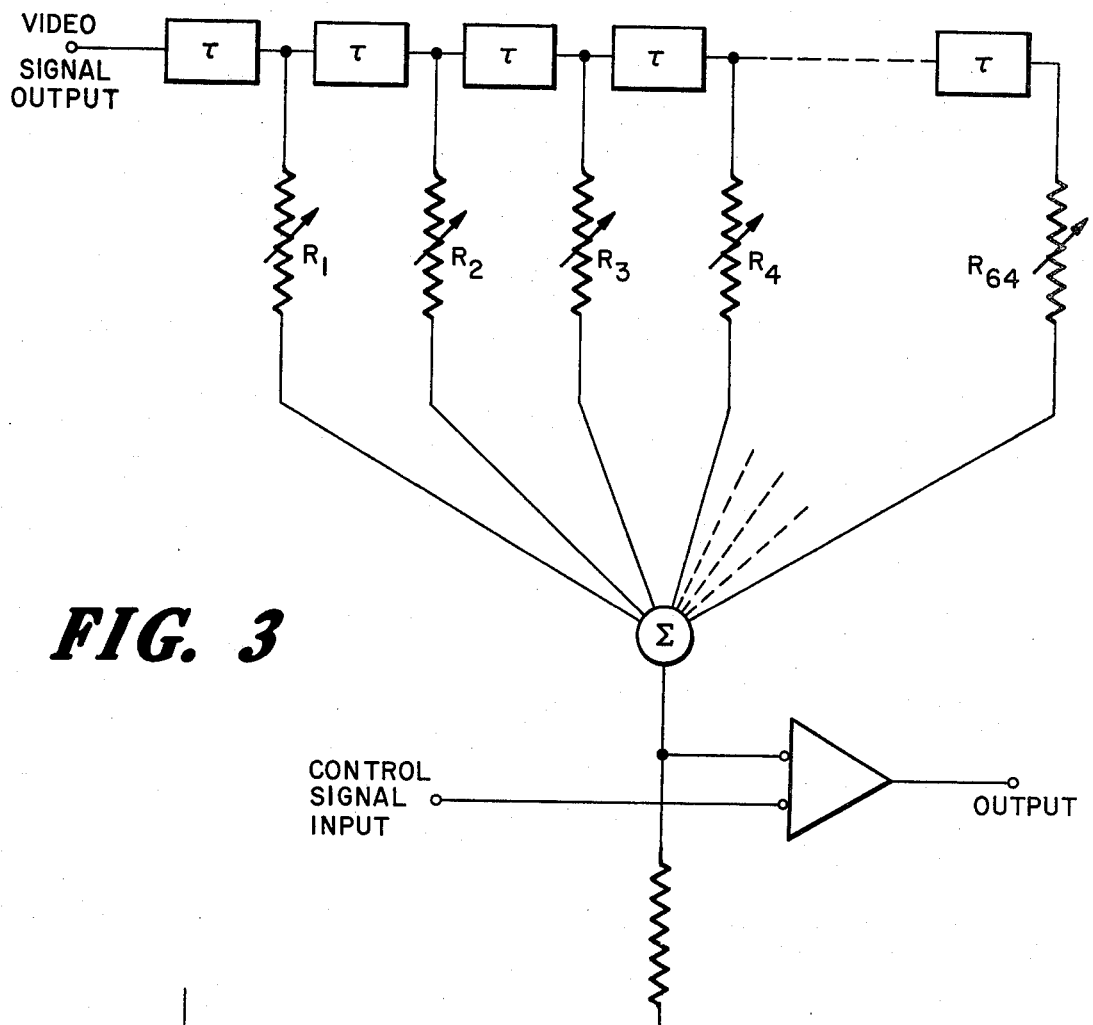
FIG. 3 is a simplified schematic diagram of a typical filter circuit in the invention.
Figure 5:
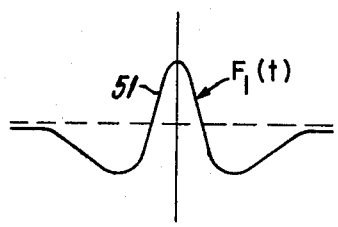
FIG. 5 illustrates a typical total filter impulse response characteristic.
Figure 4:
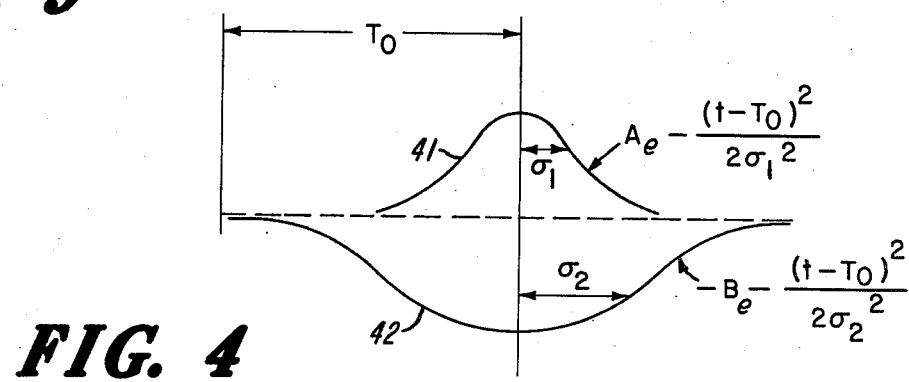
FIG. 4 is an illustrative plot showing the combining of the responses of two Gaussian filters.

A more detailed block diagram of an embodiment of the system is shown in FIG. 2. A slow scan TV camera 11 scanning at a typical rate of 12 frames per second is suitable for this invention. The filters 13 and 16 are tapped adjustable delay lines, such as the type manufactured by RETICON for example. A typical filter has 64 taps and is typically constructed as shown in FIG. 3. The $\tau$ symbols in FIG. 3 represent signal delay times between sample points. The 64 R values are adjustable so that the voltage drop across a resistor $R_i$ (where $i=1, 2, 3, \ldots 64$), for an impulse input is equal to the desired filter impulse response at time $i \times \tau$. The desired value of $\tau$ for a slow scan TV is 0.3 msec. The resistance values $R_i$ may be set according to the equation $R_i = R\, e^{-(i-\mu)^2/2\sigma^2}$ where i is the index of the resistor (1 to 64), $\mu = 33$ and $\sigma$ can range from 0.5 to 16. (Preferred values.) R is a constant value chosen so as to match the impedance of the associated equipment. The impulse response specified above is a Gaussian function and the filters $F_1(t)$ and $F_2(t)$ of FIG. 1 would be made up of two such filters the output of which are summed together. One filter produces a positive Gaussian function such as curve 41 of FIG. 4 while the other produces a negative Gaussian function, such as curve 42 of FIG. 4. The sum of the two is similar to receptive fields measured in the human visual system. A typical total impulse response of $F_1(t)$ then is shown by curve 51 in FIG. 5 and is given by the Equation $$F_1(t) = Ae\frac{-(t-T_o)^2}{2\sigma_1^2} - Be\frac{-(t-T_o)^2}{2\sigma_2^2}.$$

The preferred value of $T_o$ is $T_o = \tau \times 33$ and t is given by $i \times \tau$. The typical response shown is a bandpass characteristic filter. If $B=0$ it is a low pass filter of adjustable bandwidth. If $B=A$ and $\sigma_1 < \sigma_2$ a high pass filter would be approximated. A HUGHES 1139 scan converter is a suitable memory device and scan converter for use in the invention. A TEKTRONIC Model 632 video monitor is a possible display device 17 for use in the invention. The controller 21 is a conventional timer and synchronous pulse generator for coordinating the operation of the elecronic circuits. It uses synch signals from the video camera 11 to control the read and write cycles of the scan converters and the clock times of the filters. The electronic switch 22 controls which conventional scan converter 23 or 24 receives the next image frame. One scan converter maintains image on the monitor 11 while a new frame is written onto the other scan converter. This prevents flicker in the video monitor 17. It is to be remembered that input 25 is read onto the storage tube horizontally and the output 26 is read off the storage tube vertically.

We claim:

1. Apparatus providing on-line spatial filtering of images of a scene comprising:
   a. a video camera for viewing the said scene and providing a horizontal, (x direction), line-by-line scene scan in a time-varying intensity function;
   b. a first tuneable frequency filter having an adjustable passband and an adjustable center frequency cooperating with the said time-varrying function and providing filtered image signal;
   c. a storage tube;
   d. means for writing the said filtered image signal into the said storage tube in the x direction;
   e. means for reading the said stored filtered image line-by-line in the y direction and providing a time-varying function of the intensities stored in the said storage tube;
   f. a second tuneable frequency filter having an adjustable passband and an adjustable center frequency cooperating with the said time-varying function of the intensities stored on the said storage tube and read in the y direction and providing a doubly filtered image; and
   g. means for displaying the said doubly filtered image whereby the said image dispalyed of the said scene represents the initial image spatially filtered in both x and y directions.

* * * * *

UNITED STATES PATENT AND TRADEMARK OFFICE
CERTIFICATE OF CORRECTION

PATENT NO. : 4,238,772
DATED : December 9, 1980
INVENTOR(S) : Henning E. von Gierke, et al It is certified that error appears in the above-identified patent and that said Letters Patent are hereby corrected as shown below:

Col 2, line 9, change "approximately" to --- approximating ---.

Signed and Sealed this

Twelfth Day of May 1981

[SEAL]

Attest:

RENE D. TEGTMEYER

Attesting Officer

Acting Commissioner of Patents and Trademarks